United States Patent [19]

Brown, Jr.

[11] 3,961,130

[45] June 1, 1976

[54] MEMORY DIAL FOR TELETYPEWRITER SUBSCRIBERS

[75] Inventor: Pedro Brown, Jr., San Jose, Calif.

[73] Assignee: RCA Corporation, New York, N.Y.

[22] Filed: June 10, 1971

[21] Appl. No.: 151,802

[52] U.S. Cl. .............................................. 178/2 E
[51] Int. Cl.² ........................................ H04L 15/00
[58] Field of Search ............... 178/2 C, 2 E, 31, 33, 178/69.6; 179/90 R, 90 B

[56] References Cited
UNITED STATES PATENTS

| | | | |
|---|---|---|---|
| 2,384,558 | 9/1945 | Potts | 178/2 C |
| 3,511,938 | 5/1970 | Gaisser | 179/90 B |

*Primary Examiner*—Ralph D. Blakeslee
*Attorney, Agent, or Firm*—Edward J. Norton; Joseph D. Lazar; Michael A. Lechter

[57] ABSTRACT

A system for storing dial data from a teletypewriter subscriber is arranged to be stored at the subscriber station until a new number is dialed by the subscriber. The system is arranged to handle both dial-pulse forms of dialing information as well as the baudot code as used for teleprinters. Repeated spilling-out of stored dialed data is accomplished by the depression of a single switch or button provided on the teleprinter apparatus such as a touch-pad. This system is arranged to be compatible with existing teletypewriter switching exchanges of the computer or conventional automatic switch system type.

4 Claims, 9 Drawing Figures

Fig. 5. (ATE)

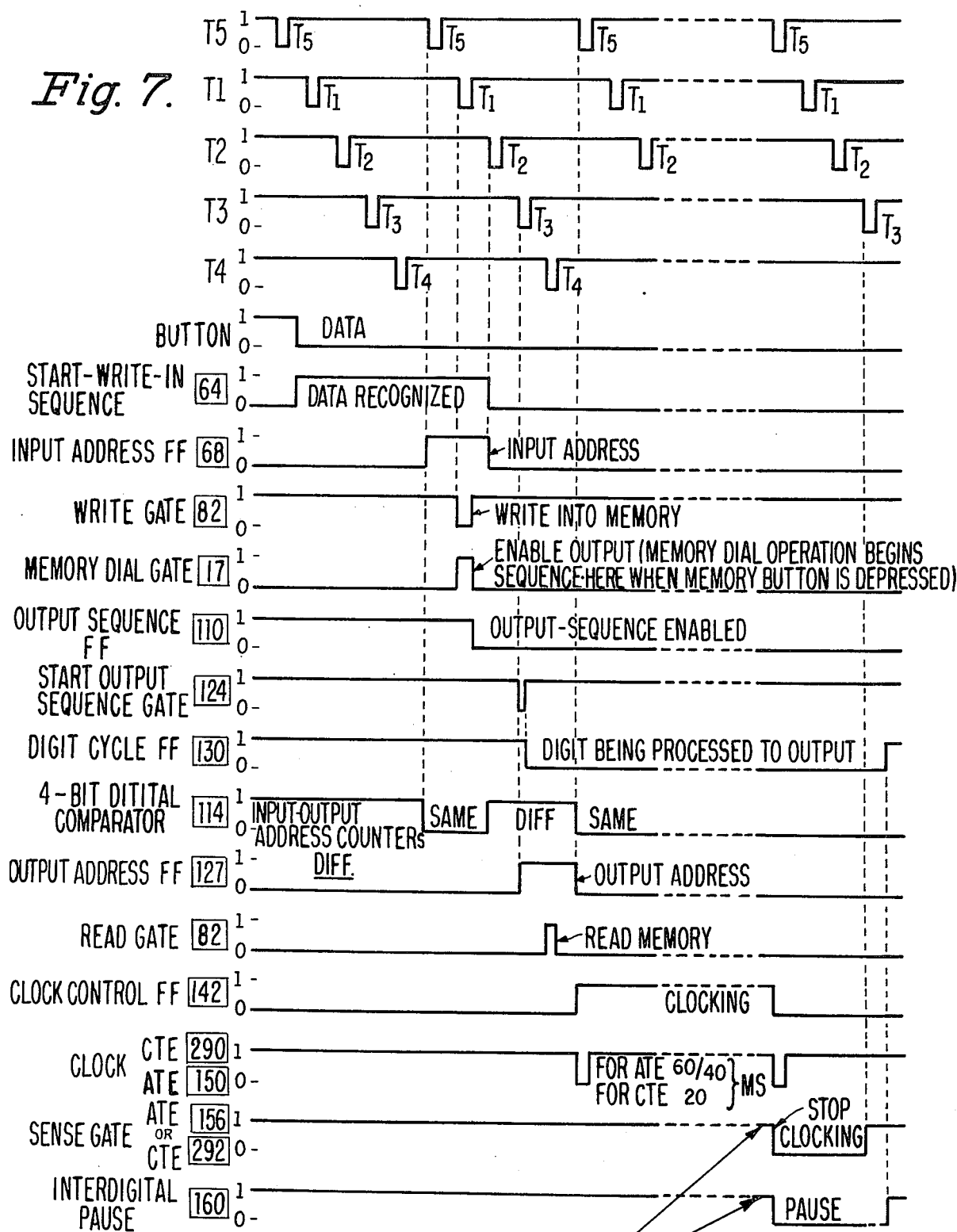

ated to pass the stored signals to the switching exchange as the digit keys are operated. At subsequent times the repertory key when operated automatically repeats the sequence of processing the same stored signals to the switching exchange for the purpose of repeating a call to the same called subscriber owing to previous busy signals or for sending new messages to the same called number.

MEMORY DIAL FOR TELETYPEWRITER SUBSCRIBERS

BACKGROUND OF THE INVENTION

1. Field of the Invention

This invention relates generally to teletypewriter systems and more particularly to the subscriber or teleprinter terminal provided with a memory dial system.

2. Description of the Prior Art

In the teleprinter, wherein a teletypewriter subscriber communicates with other subscribers in the system by dialing the called subscriber's number, the dialing is effected by the rotary dial unit that generates dial pulses that are processed through an automatic teletypewriter exchange by any of the conventional switching systems to make connection to the called subscriber. In recent years the dialing has been effected by the use of "Touch-Tone" buttons or the equivalent allowing for the subscriber to merely punch-out the desired called subscriber's number rather than be effecting a rotary-dialing operation. When a subscriber fails to reach the called subscriber owing to busy lines or a busy called subscriber, appropriate means are provided to indicate to the calling subscriber that the call has not been completed. Such indications are for example: line occupied, "all trunks busy", or the like. In order to dial the call, the subscriber must repeat the entire called subscriber's number. Such numbers may include as few as two to as many as ten digits.

Providing a means to store and retain the called number has been a problem that has not been solved satisfactorily. In telephony systems provisions have been made for storing and retaining a called number in the central offices in the form of special memory banks with elaborate access channels requiring special codes and the like for storing and retrieving such data as required. Such arrangements are very costly and tie-up many switching channels within the central offices in order to accomplish the function of storing and retaining a called number that cannot be completed on a first try. Such central office storage means have not been completely accepted because of their complexity and expense. In the teletypewriter art the problem is more difficult primarily because the central office exchanges are of relatively smaller capacity and therefore are not economically feasible or oriented for justifying the more complex storage systems that have been used in the telephony art.

According to the present invention a memory device is provided at the subscriber's terminal and accordingly obviates the complexity of central office storage and retrieval operations.

Summary of the Invention

A memory dial device is integrated with a teletypewriter terminal. According to the invention there is provided a storage or repertory dialer ("memory dial") located at a subscriber's station of a teletypewriter system wherein automatic switching functions are accomplished to connect one subscriber to another through a central switching exchange. The dialer includes a plurality of keys for generating respectively, a signal for each of a plurality of digits corresponding to a subscriber's number. A repertory key (memory dial key) is provided for generating a control signal for automatically transmitting the entire called subscriber's number as selected by the calling subscriber. Storage means are provided for storing signals generated by any of the digit keys and logical processing means are arranged to pass the stored signals to the switching exchange as the digit keys are operated. At subsequent times the repertory key when operated automatically repeats the sequence of processing the same stored signals to the switching exchange for the purpose of repeating a call to the same called subscriber owing to previous busy signals or for sending new messages to the same called number.

DESCRIPTION OF THE DRAWING

FIG. 7 is a series of wave forms in time-sequence relation useful in understanding the operation of the embodiments.

DETAILED DESCRIPTION OF A PREFERRED EMBODIMENT

Figure 1:
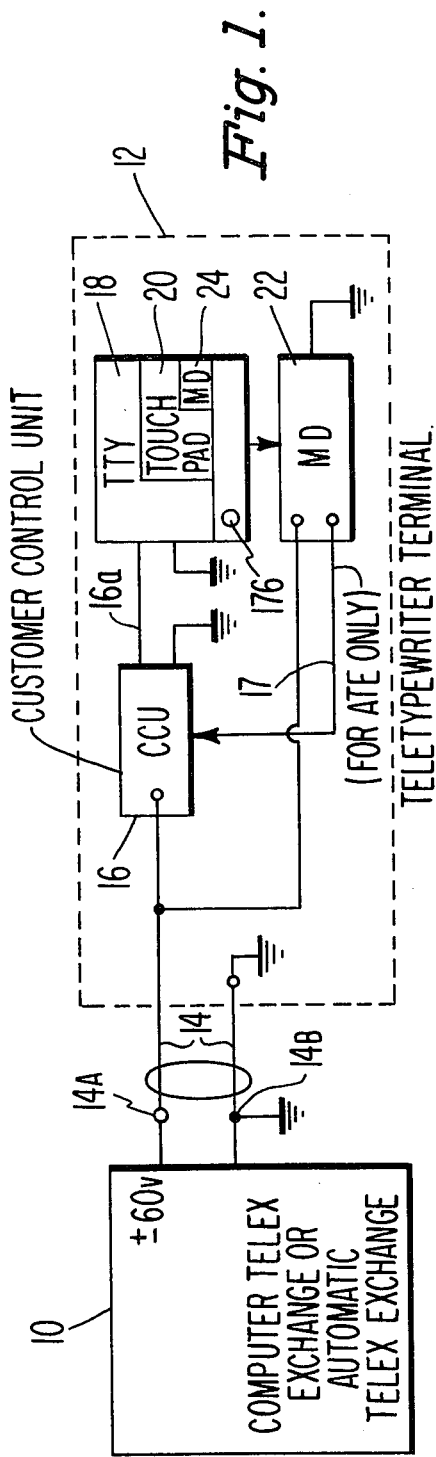
FIG. 1 is a block diagram showing a teletypewriter terminal connected to a computer teletypewriter exchange or an automatic teletypewriter exchange.

Block Diagram — FIG. 1

FIG. 1 shows generally the realtionship of the memory dial of the invention as it is used within a conventional teletypewriter terminal connected to an exchange. Block 10 is the computer teletypewriter (Telex) exchange or an automatic teletypewriter (Telex) exchange connected to a subscriber terminal or teletypewriter terminal 12 by means of a pair of wires 14, one of which is grounded. Within the usual teletypewriter terminal 12 is included a customer control unit 16, and a conventional teletypewriter 18 having a touch-pad 20. The touch-pad 20 is also of conventional design adapted to provide ground closures for each of the digital buttons. The ground signal pulses are usually conducted to an encoder for converting the pulses from the digital value of the touch-pad buttons to any desired code such as the baud code normally used in Telex systems or to dial pulses if the system is in a dial-pulse exchange.

The customer's control unit 16 is an interface between the terminal and the line of conventional design arranged to provide the appropriate voltages for operating the teletypewriter unit 18 in response to the line conditions on lines 14.

The memory dial unit 22 indicates the circuitry provided in accordance to the present invention adapted to be integrated with the teletypewriter terminal 12 to provide the means for storing and retaining the called number generated by the subscriber's touch-pad 20.

In general, when a Telex subscriber touch-dials a Telex number, the series of digits is translated into either 60/40 millisecond dial pulses or 50 baud 5-unit baudot information code pulses. The baudot code conventionally consists of 32 characters, each a combination of five pulses (5 units), with each pulse having two possible conditions, mark or space ("1" or "0" respectively). A baud rate such as 50 baud indicates that the maximum usable number of pulses-per-second that a given piece of equipment (e.g. TTY) is adapted to handle. Both the transmitter and receiver must have equal baud rates to operate properly. The signal generated for each character in the 50 baud 5-unit code is preceded by a single unit space (START) followed by the 5-unit baudot code and ending with a mark pulse (STOP) of 1.42 units duration for a total unit length of 7.42. In the 50 baud system each unit is 20 ms in duration. In detail, for a 50 baud system, the TTY shaft turns at 404.313 rpm or 6.74 rps. Each revolution of the shaft generates a character of 7.42 pulses in length. It follows, then that in 6.74 revolutions the shaft will generate (6.74 × 7.42) or 50 pulses in 1 second. Therefore the designation of 50 baud is given. The stop pulse may be longer than 1.42 units but never shorter. These signals of the dial pulse or of the baudot type are transmitted over the metallic pair loop (14) to a Telex switching exchange 10.

Substantially simultaneously with the operation by the subscriber of the touch-pad buttons 20, the digits are stored in the memory dial device 22. The series of the stored digits comprise the dialed Telex number. The number is kept in the memory indefinitely subject only to the customer changing the stored number by merely dialing a new number. The touch-pad 20 is provided with a memory dial button 24 which upon depression starts the memory dial circuit to spill-out the entire called-number which was previously registered in the storage portion of the memory dial circuit. The memory dial button 24 can be depressed for the dialing function as many times as desired for that particular stored number. Thus, for conditions of lines that have been busy or otherwise unaccessible, the mere depression of a memory dial button 24 allows for the subscriber to make a call repeatedly and at will.

Figure 2:
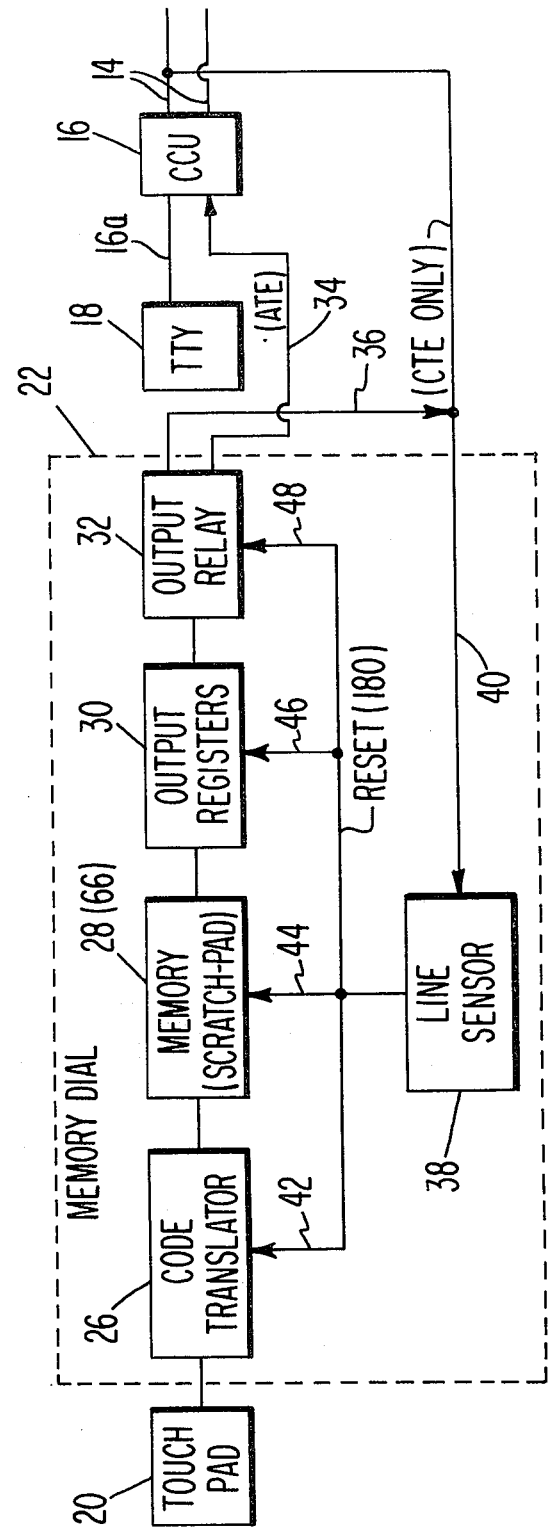
FIG. 2 is a block diagram showing in greater detail the memory dial unit of the invention in relation to the conventional touch-pad, teletypewriter, (TTY) and customer's control unit (ccu).

Block Diagram — FIG. 2

In the block diagrams shown in the several drawings to be described there is employed a series of block diagrams which represent circuitry well known in the art for carrying out the functions indicated. Thus, for example, FF is the symbol representing flip-flop which may be any conventional bistable device which provides a first output in one stable state, and a second output in its other stable state. The gates may also be flip-flops or other triggered devices that respond to a single pulse to develop an output voltage from the device. A counter is a register that can be reset to logical 0 which either totals a digital number or adds binary logical 1 to a column of digital numbers. The comparators are circuits that compare two binary signals and provide an output to indicate agreement or disagreement. The memory unit may be a conventional state of the art device such as a scratch-pad memory or a random access memory. Such a memory circuit includes an array of transistor logic units designed for use in high-speed circuits. For example, the 64-bit memory used in one embodiment of the invention comprises a Ratheon-type random access memory identified as RR6100. It consists of 64 RS flip-flops arranged in a 16-word by 4-bit array. When the memory is enabled by CF, being at logic 0, the four address bits select one of 16 words. This readout is non-destructive and the flip-flops remain in their respective states. Other devices performing similar funcitons suitable for this invention are disclosed in the testbook, "Pulse and Digital Circuits" by Newman and Taub, McGraw Hill, 1956.

In the circuit illustrating an embodiment of the present invention, electrical signals manifest binary digits or logical bits. A signal at one voltage level represents the bit 1 and a signal at another level represents the bit 0. To simplify the following discussion, the bit itself may at times be referred to as representing the signal.

As indicated above the logical elements shown in the drawing are in themselves known. The gates are of the NAND type. Thus, the NAND-gates produce a 0 output in response to all inputs at a 1 level and a 1 output in response to all other input conditions. The comparator circuits are as indicated above.

FIG. 2 shows in greater detail the memory dial unit 22 of the invention illustrated generally in FIG. 1 as block 22. The touch-pad 20 is connected to the memory dial unit through a conventional code translator 26 which serves to convert the individually-depressed digits from the touch-pad 20 into an appropriate code. If the system is an automatic Telex exchange (ATE) wherein conventional dial pulses are used, the code translator will develop a binary code which will later be developed into dial pulses. If the system is to be in a computer Telex exchange (CTE), the code translator 26 develops the baudot code. The code translator 26 spills its output into a memory 28 suitable a conventional, stratch-pad, IC (integrated circuit) module. The memory 28, under suitable controls, passes the individual code pulses through the output register 30, which, in turn, functions to pass the code pulses in sequence to the line for transmission to the exchange. For the automatic exchange (ATE) the output register 30 controls the number of dial pulses corresponding in quantity to the originally selected button on the touch-pad 20. Prior to being transmitted over the line the dial pulses are repeated by an output relay 32 of conventional design. This relay circuit 32 functions generally as an isolator of the higher voltages developed on the output side from the relatively lower voltages used within the memory dial unit. For the automatic Telex exchange systems the output from relay 32 is passed over a path 34 to the customer control unit 16. The customer control unit 16 develops a physical make and break of the line 14 for transmission to the exchange of the dial pulses corresponding to the called subscriber's number. For systems in which the computer is used the output from relay 32 is carried over path 36 to directly make and break line 14 for transmission to the exchange in baudot code.

The line sensor 38 consists of a pair of solid state relays which respond to the polarity of the lines 14 over control path 40 to establish and control the conditions of the various components of the memory dial unit 22 over the control paths 42, 44, 46 and 48.

Block Diagram — FIGS. 3a, 3b, 3c, 4 and 5

Figure 3A:
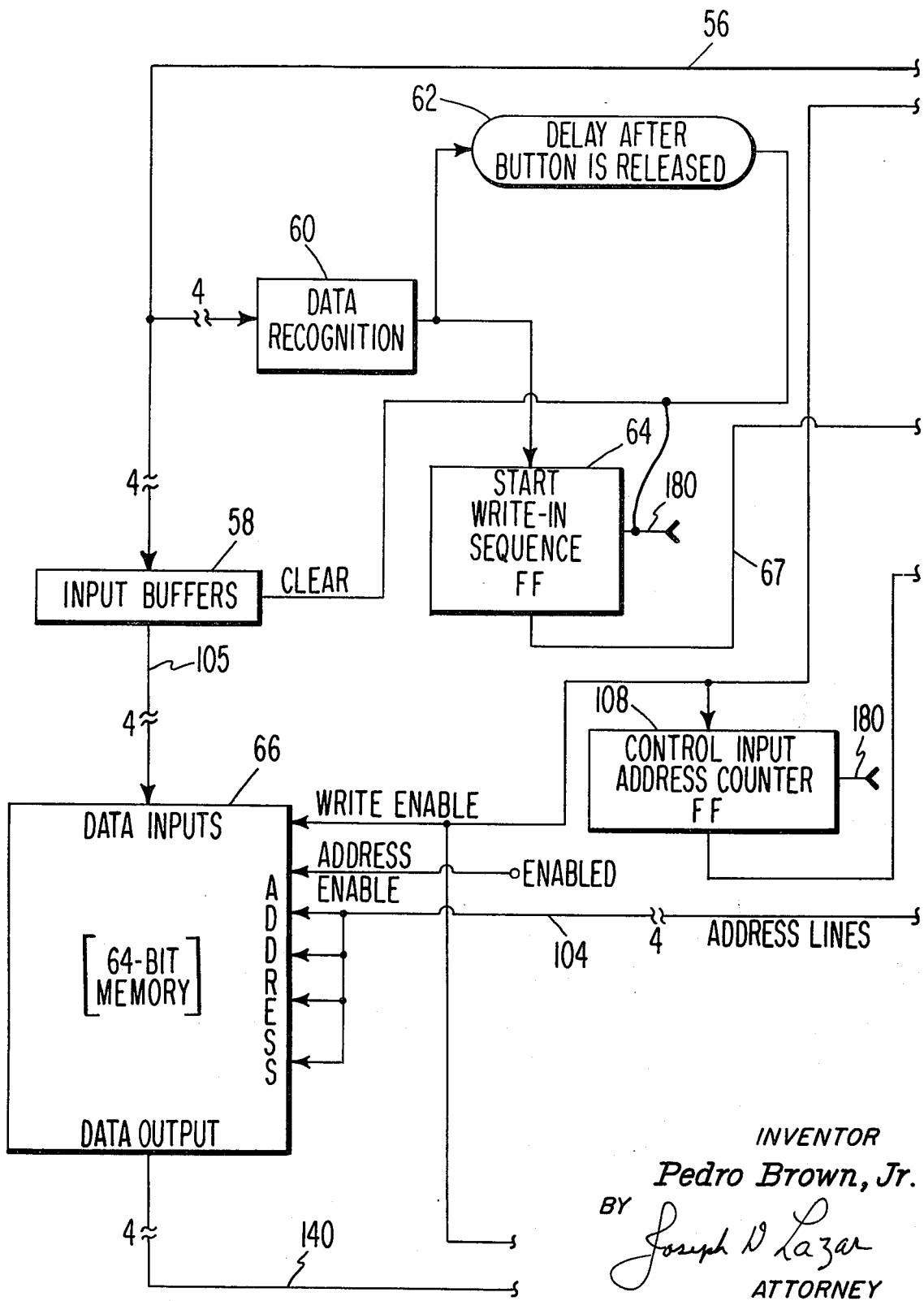
FIGS. 3a, 3b and 3c are block diagrams of the system showing the components of a system common to both automatic teletypewriter exchange and computer teletypewriter exchange systems.
Figure 3B:
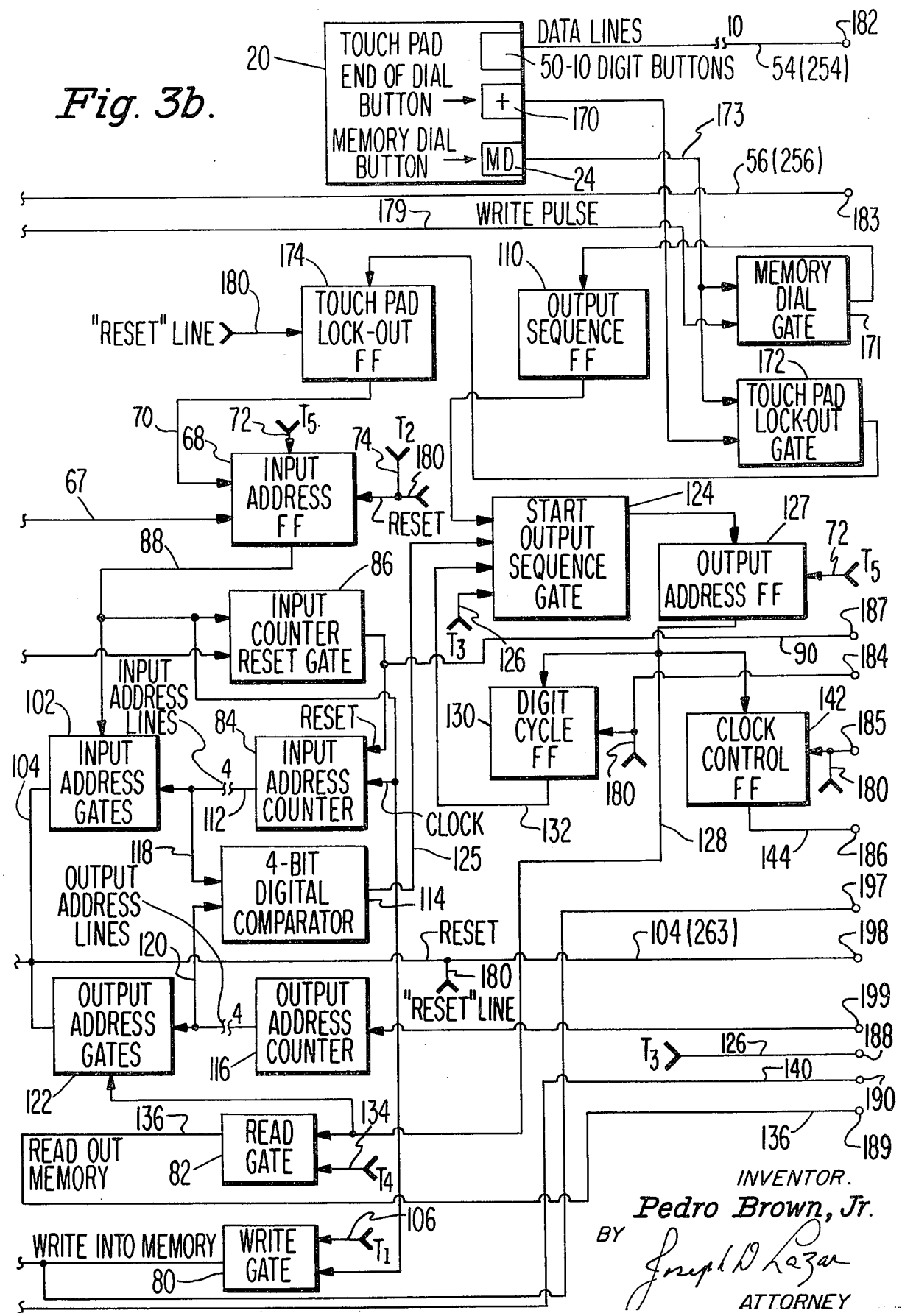

A detailed description of one embodiment of the invention illustrated for use with an automatic Telex exchange will be first described with reference to FIGS. 3a, b, c, 4 and 5. The first digit of the called number is first depressed on one of the ten digit buttons 50 which develops a ground signal for application to the encoder 52 over one of the ten conductor paths 54. The encoder is of conventional design arranged to encode the digital data to a code in binary form which appears on the four output channels of the encoder conducted over paths 56 to an input buffer register 58. The encoder may consist of suitable diode-arrays or preferably NAND gates which as known is an AND gate with an inverter. The buffer stage 58 is suitably an IC (integrated circuits on a chip module). The buffers 58 serve to prevent such noise in the system as would usually develop and record false and eratic signals. According to the invention the buffers assure accurate storage and recordation of the desired data. When the digit button is first depressed the encoder 52 output passes the appropriate binary signal to the buffer 58 and simultaneously to a data recognition unit 60. The data recognition circuit 60 is formed of a group of four inverters, the input of each of which are connected to one of the four conductors 56. The inverters develop a voltage in their output in response to the operation of both the depression and release of the digit button. The digit button depressed enables a Schmidt trigger 62 and on release triggers the same Schmidt trigger 62. The Schmidt trigger 62 is the known and conventional circuit to effect a delay and is arranged with preferably a 30 millisecond delay. It functions to repsond to the change of the condition from the output of the data recognition unit 60 produced on the release of the digit button 50. This delay trigger circuit is preferred to obviate the effect of bounce that occurs on the release of a button utilizing a spring. It is known that the button depression time has no bounce effect during the initial 200 nanosecond period. However after thatt time bounces can occur which could develop false signals in the system. For that reason the Schmidt trigger delay circuit times for 30 milliseconds obviates any harmful effects of the spring bounce when the button is released.

The output of the Schmidt trigger 62 develops a pulse that will clear data previously stored in the buffer registers 58 preparing these buffers for new data entry.

Figure 3C:
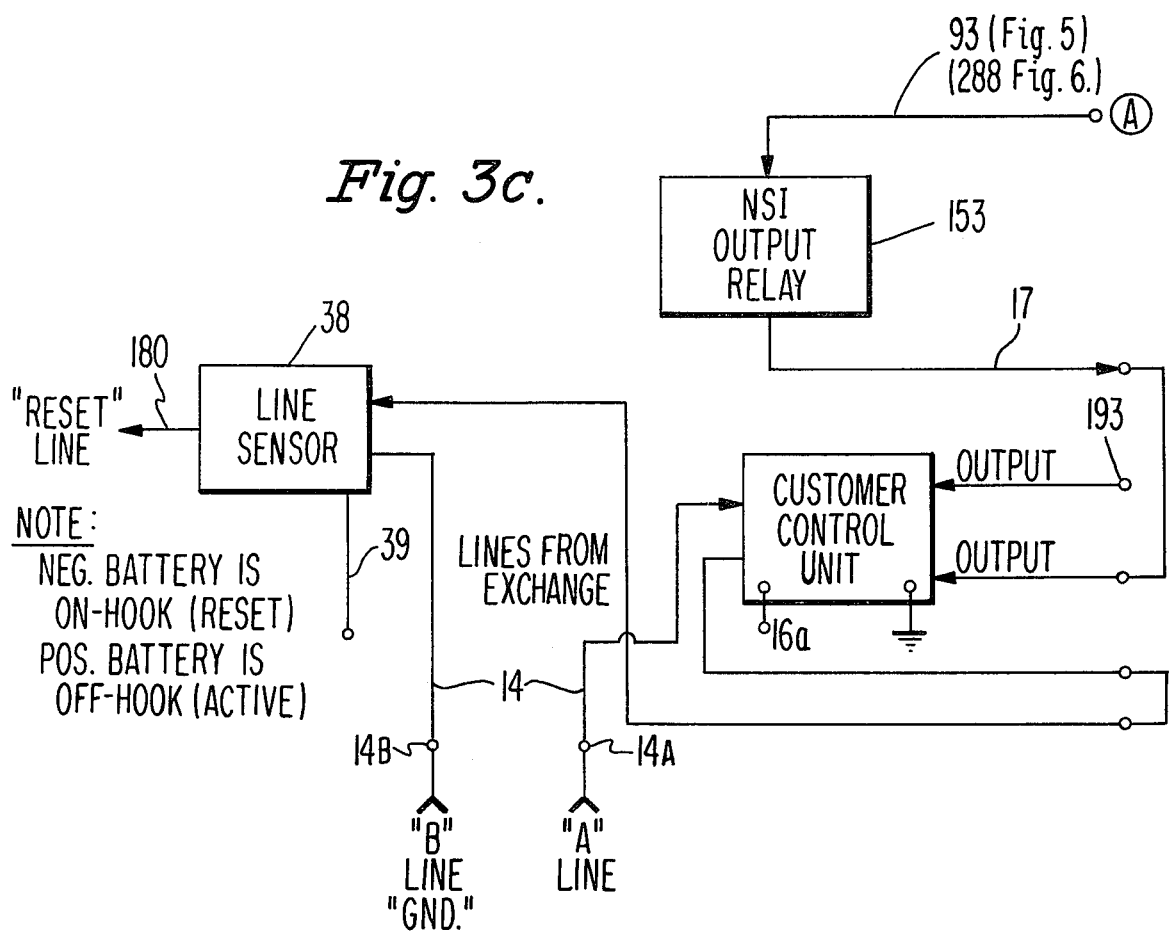

Data is stored in a memory 66 which is a conventional scratch-pad memory having the capacity of 16 four-bit words, which capacity is satisfactory for handling most of the subscriber calls that are expected to be made in the system. The flip-flop 64 starts the write-in sequence by causing the various components of the system to process the dialed digits by the operator into the memory 66 in the following manner. An output voltage transition generated by the flip-flop 64 produces a certain voltage level which is applied over conductor 67 to an input address unit 68 consisting of another flip-flop which is under the control of three inputs via conductors 70, 72 and 74. The flip-flop 64 is reset to its reset position over a reset lead 180 from line sensor 38 (FIG. 3c). To avoid undue drawing complexity every logic device which is reset is understood to be connected to the reset path 180. The input control signals to the input address flip-flop 68 are generated by a clock or a T-pulse generator 76 of suitable design consisting of a 5-bit shift register 78 and suitable control gates which serve in this system as a T-pulse generator illustrated in FIG. 4. The generator 78 is arranged to generate separate square wave pulses identified as T1, T2, T3, T4, and T5 shown in the output of the T-pulse generator as arrows for convenience of the circuit arrangement. A chart of wave forms related to the T-pulses is illustrated in FIG. 7. The outputs T1 – T5 are connected to each of several components of the system as indicated by the arrow heads received in the correspondingly numbered tails. Each of the pulses are preferably 10 microseconds in duration and 50 microseconds in spacial relationship. A T-pulse operating a gate will generate a pulse on the output, so that in reference to a gate, a pulse may occur, but in reference to a FF, a transitional voltage rather than a pulse will occur. The purpose of the T-pulses is to control the operation of the memory dial in sequence as will be described and as shown in FIG. 7.

In general the T-pulses serve to control the circuit operation to perform the following functions:

T5 — initially enables the operation of the input address flip-flop 68;
T1 — enables the "write" gate 80;
T2 — disables the input address lines by inactivating the flip-flop 68;
T3 — enables the operation of the output address lines by rendering operative the output address FF 127 via the output sequence gate 124;
T4 — enables the read-out gate 82 which functions to read the data out of the memory 66; and
T5 — at the end of the cycle disables the output address lines by inactivating the flip-flop 127, and initiates the input address sequence again, to repeat the timing cycle.

When the write-in sequence is initiated by the triggering of the input address flip-flop 68 by the T5 pulse, there is produced a voltage transition at the output of FF 68. This voltage, now on path 88, causes several functions to be performed.

First, the input address counter 84 is reset to a 0 via a voltage transition generated by the input counter reset gate 86 in response to the flip-flop output 68 over path 88 in response to the T5 pulse on path 72.

Second, the output of the gate 86 also disables the "beeper" circuits simultaneously with the operation of the reset gate 86 over path 90. Disabling of the beeper will always occur when a "new" number is being dialed. Only during memory dialing will the beeper respond to dial pulses which are being sent over the transmission lines. The beeper is enabled by a flip-flop 92 which generates a voltage transition to enable a gate 94 which in turn actuates the beeper 96 when dial pulses are transmitted during memory dialing. Suitably the beeper is a device known as a SONALERT.

Any equivalent means of assuring the user or the customer that the system is operating by a sound produced in response to the desired coded pulses that are used for the called number during memory dialing will serve this function. The voltage transition from flip-flop 68 thus inactivates the beeper 96 during the time that a new code is being read into the memory. The beeper 96 when it is reset for operation will receive pulses over path 98 during memory dialing as will be described later.

Third, the signal on path 88 also enables the input address line by rendering the input address gates 102 in an operative condition to transmit binary codes into the memory 66 over the conductor path 104. Each binary code will locate one four-bit word.

Fourth, the path 88 also enables the write gate 80 to be operative ready for the next T-pulse.

With the memory dial unit 22 at this stage, data will be available at the input of the memory unit 66 over the four data bit lines conducted over path 105. The address line 104 will have been enabled and gate 80, as just, explained, is also enabled. At this time a T1 pulse will cause the data to be written into the memory 66 at the address location given by the input address counter 84. The memory unit 66 is preferably arranged with sense amplifiers to cause the output of the memory to be readout in complementary or inverted binary values. Thus, if a 0 is stored, the output will be a 1, and vice versa. The pulse T1 is generated by the T-pulse generator 78 and applied to the circuit over conductor 106. The pulse T1 is applied to the write gate 80 whose output is a write pulse into the memory 66. The write pulse also triggers the control counter reset flip-flop 108. The output voltage transition from flip-flop 108 disables the input counter reset gate 86. Any further depressions of the button on the touch-pad 20, causing further voltage transitions from the output of input address FF 68, will not cause further transitions on the output of gate 86, thereby never allowing input address counter 84 to be reset to 0 while dialing a new number. The disabling of gate 86 prevents voltage transitions from input address FF 68 applied to input counter reset gate 86 to disturb the disabled condition. Thus, no further actuations or depressions of the button on the touch-pad 20 will cause a reset of the input address counter 84.

The input address counter 84 counts by storing the number of times a customer has depressed a button 50 on the touch-pad 20. Thus the T1 pulse causes the circuit to store the data corresponding to the first digit entered by the subscriber into the memory 66.

With the data stored in the memory, the T2 pulse over conductors 74 resets the input address flip-flop 68. The output voltage transition of FF 68 will return the voltage on path 88 to its old state causing the input address gate 102 and write gate 80 to be inhibited. Finally the input address counter 84, which is also on path 88 recognizes this second transition and increments to the next count which will appear as a binary code on the four conductor paths 112 to the input address gates 102. Scratch-pad memory 66 at this stage now has one digit in storage at level 0 which digit corresponds to that first depressed by the customer on touch-pad 20.

The time of operation from the moment the customer depresses the button 50 of the selected digit until corresponding digit has been recorded in the 64-bit memory 66 is about 300 microseconds. The fastest manual operating time for a button 50 from one digit to the next digit is in the order of 100 milliseconds. Accordingly, the operation time of the circuit to record each digit as it is operated by the customer is so rapid there is no possibility that a second digit caused by the operation of the second button by the customer or user will cause any interference.

A four-bit digital comparator 114 is coupled to the input address counter 84 and an output address counter 116 to receive the status of each counter respectively over conductors 118 and 120. The output address counter 116 is coupled to the output address gates 122 which in turn are connected to the memory 66 via conductor 104.

One digit is now in storage, as has been described, and the four-bit digital comparator 114 senses the condition of hte input address counter 84 at a count of 1. At this condition the output address counter 116 is at a count of 0 indicating that no output addreses or readout have been made. The difference indicated by the comparator produces a voltage transition which enables the start output sequence gate 124 over conductor path 125. Now pulse T3, the output address pulse, is generated by the T-pulse generator 78 and applied to the output sequence gate 124 over conductor 126. With gate 124 operated by pulse T3 the output circuit will operate and retrieve the number that is now in storage in a manner that will be explained.

The pulse T3 causes the output address FF 127 to be triggered via gate 124. The output voltage transition of the output address flip-flop 127 will cause the following functions:

First, it will enable both the output address gate 122 and read gate 82 over conductor path 128. It also triggers the digit cycle flip-flop 130 over the same conductor path 128. The output address gate 122 consists of four NAND gates responding to gating voltages to pass voltages of suitable level. The digit cycle flip-flop 130 on being disabled will remain in that disabled condition unitl the first digit has been completely processed out on the line 14.

The disabled digit cycle flip-flop 130 disables the start output sequence gate 124 over path 132. The digit cycle flip-flop 130 it is noted remains disabled and thus prevents the pulse T3 from operating the "output circuitry" until the selected digit is completely processed.

Figure 5:
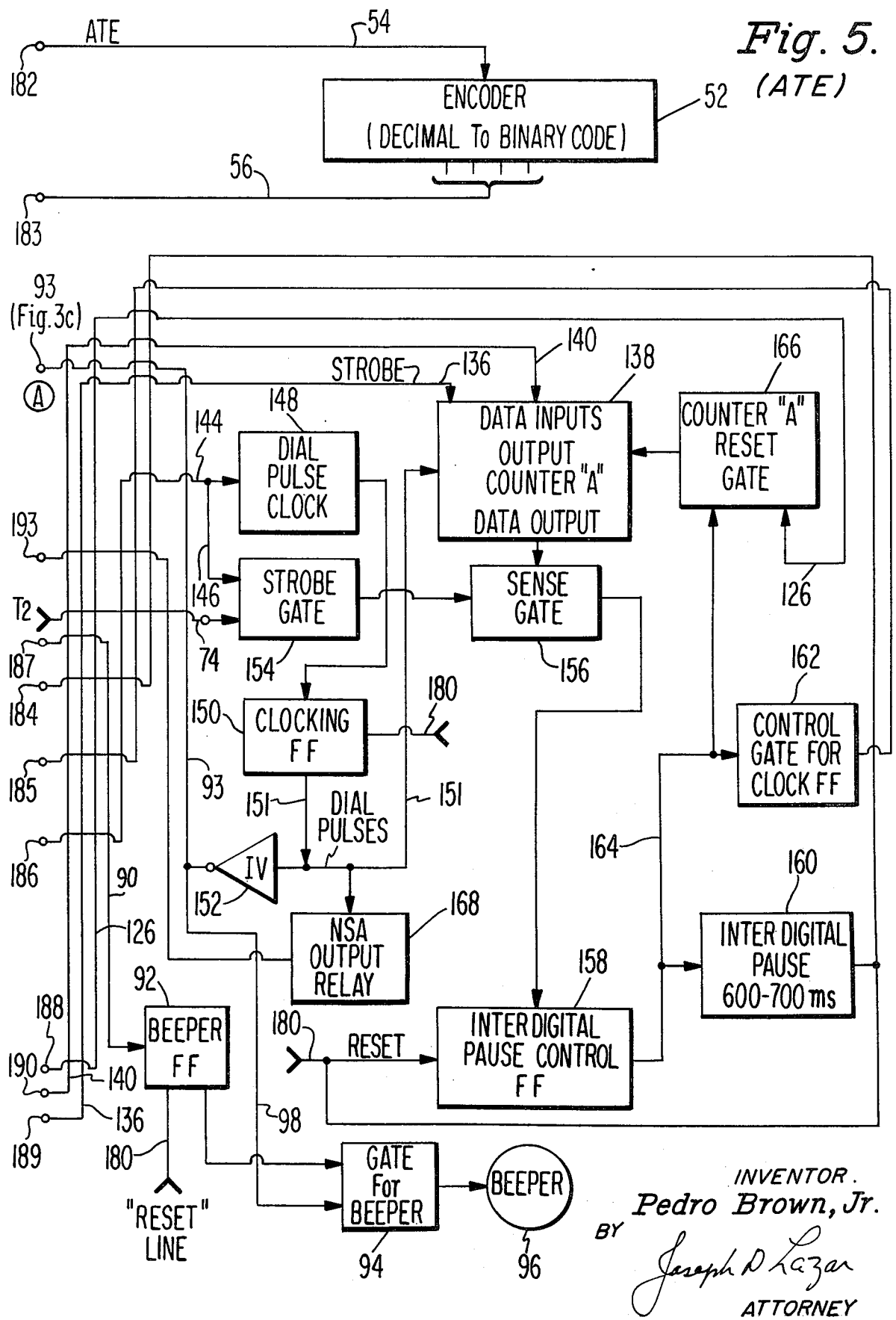
FIG. 5 shows the details in block diagram form of the automatic teletypewriter exchange portion of the system.

When entering data into the memory 66 from the touch-pad 20, the T-pulses T5, T1 and T2 control the circuit components comprising the blocks shown in FIG. 5, particularly those that are utilized in the write-in sequence or input circuitry. These circuit components perform the functions needed for entering data into the memory. The only link to the output circuitry is through the output sequence gate 124. The "output circuit" controlled by the output sequence gate 124 are those circuit portions within the blocks which will retrieve data from the memory 66 under control of the T-pulses T3, T4 and T5 and subsequently process such data onto the transmission lines 14. Therefore, it will be appreciated, that the input circuitry can operate independently of the output circuitry. It is to be further noted that a T5 pulse may reset the output circuitry and at the same time enable the input circuitry, if a subsequent dial button is depressed at that moment.

The next output from the T-pulse generator 78 develops the T4 pulse carried to the circuit by conductor 134. The T4 pulse causes the read gate 82 to generate a pulse identified as a strobe pulse over conductor 136 to the output counter (A) 138. The strobe pulse will gate the output counter 138 to read the data over the four conductor paths 140 from the scratch-pad memory module 66. The data that is read into the output counter will be determined by the state of the output address counter 116. As known in the art, the state of counter 116 will determine which of the sixteen rows of four-bit information is to be read out of the memory unit 66. The output address counter 116, it is to be noted, is always reset to a count of 0 after the end of each completed call by the reset line 180 which clamps the memory dial unit 22 inactive when in the on-hook position. At this stage of the operation, that is, after the first digit has been depressed by the user and has been read into the output counter from the memory, the output address counter will be at the first row of the memory over address line 104.

The next step under control of the T-pulse generator 78 is the production of the pulse T5 over conductor 72.

T5 when applied to the output address flip-flop 127 will cause FF 127 to be reset and change its output voltage on path 128 to return to its former state. This will cause the following functions;

First, the voltage level on path 128 will disable the output address gate 122, and will also cause the output address counter 116 to increment a count of 1. This is accomplished by the output address counter 116 recognizing the voltage level on path 128 returning to its original state. The voltage level on path 28 will also cause the read gate 182 to be disabled. Finally, the T5 pulse will trigger the clock control flip-flop 142. Effectively, the clock control FF 142 is now operative and will not be disabled until the data is processed.

The clock control flip-flop 142 when triggered will trigger the clock pulses for dialing over conductor paths 144 and 146 to control a dial pulse clock 148. The dial pulse clock 148 upon being triggered by the clock control flip-flop 142 energizes the clocking flip-flop 150 to generate pulses to be applied to the line via conductor 151. The clocking flip-flop 150 is suitably arranged together with the dial pulse clock 148 to produce dial pulses of a 60 millisecond break and a 40 millisecond make. These dial pulses are then processed through the inverter 152 which applies the proper inverted signals to operate the (NSI) output relay 153 (FIG. 3c) and then to the customer control unit 116 via conductor path 17. These pulses are then passed on to the line 14 to the exchange 10 as indicated in FIG. 1.

After the data has been entered into the output counter (A) 138 via the strobe pulse from the read gate 82 on path 136 and the clock pulses have begun, the output counter 138 will count the number of dial pulses sent out on the line. For example, if the number, 5 is depressed on the touch-pad 20, a 5 will be stored in memory. Because the sense amplifiers in the memory invert the data at its outputs the fifteens-complement of the number, in this case 5, is 10 and this complement of 10 is read out of the memroy 66 and entered into the output counter (A) 138 in a manner known in the art. It will now require five dial pulses, corresponding to the number depressed, until the counter (A) 138 counts to 15. At the count of 15, the clock 148 will be stopped, and an interdigital pause of 600–700 ms. will now allow another digit to be processed. This pause is a requirement of the conventional teletypewriter exchanges.

To determine whether the counter 138 has reached the count of 15, use is made of the T2 pulse over conductor 74 to a strobe gate 154 which in turn controls the operation of a sensing gate 156.

The T2 pulse is generated by the T-pulse generator 78 every 250milliseconds. This causes the strobe gate to check the sense gate 156 by that period of 250 milliseconds. When the cycle of the T2 pulse appears at the sense gate 156 after counter "A" 138 has reached a count of 15, the sense gate 156 will trigger two circuits. First the clock control FF 142 via control gate 162. This will cause a voltage transition on the output of the clock control FF 142 to disable the dial pulse clock 148 and strobe gate 154 via path 146. Further dial pulses will cease and the T2 pulses strobing the sense gate will cease. Second, interdigital pause control flip-flop 158 triggers a 600 millisecond delay at 160. This circuit is suitably a Schmidt trigger which fires for 600 ms. At the end of this interval a short pulse (10 microseconds) is developed on the output of this device 160 to signal the end of the 600 ms. period and finally enables the counter A reset gate 166 over the same operating path 164. During the dial pulse generation of the interdigital pause, data may be entered into the memory 66 without interferring with the output control circuitry. As the interdigital pause is timing out during the 600–700 millisecond period, a T3 pulse from the T-pulse generator 78 over conductor 126 resets the output counter A (138) by means of the reset gate 166. After the interdigital pause, a pulse will trigger and reset both the interdigital pause control flip-flop 158 and the digit cycle flip-flop 130. This will cause the next digit, if any, that was entered into the system from the touch-pad 20 to be processed in the output circuit from the memory 66. The determination of whether another digit is to be processed will be determined by a difference reading between the input address counter 84 and the output address counter 116 as will be determined by the comparator 114.

Thus, any digits that are applied to the system by means of the touch-pad 20 will be processed in the manner just described.

If there are no other digits the comparator 114 will inhibit the output circuit via the conductor 125 applied to the output gate 124 from operating since a 0 rather than a 1 will be generated by the comparator. Comparator 114 will indicate a 0 when there is a difference in the counters 84 and 116 and will indicate a 1 when they are the same. When the counters are the same there are no further digits to be processed and a 1 will appear on the output of the comparator. The output of the comparator is inverted by an inverter not shown in the block diagram.

The NSI output relay 153 will normally have its contacts closed and thereby hold the exchange lines 14 closed through the customer control unit ccu 16 and dial-pulse the line during operation, in response to each dial-pulse applied to it from the inverter 152 as previously explained. "NSI" and "NSA" are the nomenclature used in conventional dial pulser to simulate the normally open (NSA) and normaly closed (NSI) contacts on a rotary dial unit.

The output relay (NSA) 168 responds also to dial pulses generated by the clocking flip-flop 150. This relay will normally be open and will hold a relay (not shown) in the ccu unit 16 closed whenever the relay 168 is open. This procedure of operation is necessary in order to provide ccu 16 with the proper operating condition for this mode of operating the memory dial (ATE). It is to be understood that the customer control unit 16 is conventional and well known in existing teletypewriter exchanges. It is necessary therefore to modify only the NSI contacts for normally closed condition in order to make the circuit of this invention compatible with such a teletypewriter unit. This is conveniently done by a printed wiring card arranged to short circuit the appropriate terminals of the ccu 16. However, as will be apparent to those skilled in the art various other modifications may not be necessary if the customer control unit (ccu) does not require such a mode of operation.

The last digit that is depressed on the touch-pad by the operator is the "end of dial" button 170, also indicated conventionally as an EOD button. This button is arranged to indicate to the system that the last digit has been depressed, by operating the touch-pad lock out gate 172 which in turn will trigger the touch-pad lock out flip-flop 174. FF 174 will inhibit the input address flip-flop 68 from triggering the input circuitry starting with energizing the input address gates 102 and the other circuits connected to the output path 88 of the flip-flop 68. Thus any other depressions of the buttons on the touch-pad 20 will be disregarded as data input until the entire memory unit 22 is reset again by an on-hook off-hook operation. The on-hook off-hook operation is conventional. In this embodiment exchange 10 provides for the off-hook operation by positive 60-volts over line 14 to the teletypewriter terminal 12 (FIG. 1). In this condition the memory dial 22 is reset by the line sensor 38 (FIG. 2).

For the idle or on-hook operation, the exchange provides negative 60 volts. When the subscriber depresses and releases his start button he opens and closes the line 14. The opened line is recognized by the exchange causing the exchange to produce a positive 60 volts for this off-hook or call condition. The memory dial 22 is no longer reset by line sensor 38 and, thus, the dialing by the subscriber may proceed.

For systems where there are no negative line voltages provided for "reset", an external reset can nevertheless be accomplished by connecting a ground to line sensor 38 as by conductor 39.

Operation of the Memory Dial Unit

A summary of the operation of the system according to this embodiment will now be described.

Assume that a series of dial pulses corresponding to a called number has been generated and transmitted on the line 14. If the teletype terminal called is occupied, the exchange 10 (FIG. 1) will transmit to the calling teletype terminal a 100 millisecond space pulse. This pulse is recognized by the ccu 16. The ccu 16 will start the motor in the teleprinter necessary to print characters on page copy. The exchange then transmits 50 baud 5-unit code pulses that are recognized by the calling teleprinter. "OCC" is usually printed if the called teleprinter is busy. This message is repeated several times and then the exchange 10 will shut-down the calling teleprinter in an on-hook mode. In order to reestablish the connection of the teletypewriter terminal to the exchange the operation of the start button, indicated as 176 (FIG. 1) on the teleprinter 18, will reconnect the teleprinter to the exchange in a manner well known in the art. Other suitable arrangements can be made at terminals as will be apparent to those in this art.

During the time that the line 14 is disconnected from the exchange 10, the conventional line sensor 38 causes the reset of the memory dial unit 22. The line sensor 38 consists (not shown in detail) of two (A and B) relays and two diodes with NAND circuitry arranged as flip-flops for control of the memory dial unit 22. The exchange lines 14 are in either a positive 60 volt mode (off-hook) or negative 60 volt mode (on-hook). When in the negative 60 volt mode, only one (A) of two relays is operated, the other (B) being shunted by a diode. The (A) relay contacts are closed in this mode and place a voltage on a flip-flop (not shown) which, in turn, through gating circuitry, places a "reset" level to part of the memory dial unit making it inactive over path 180.

When the exchange reverses polarity on its transmission lines to the positive 60 V mode, the other (B) relay operates and the first (A) relay is shunted by a diode. The relay contacts close placing an appropriate voltage level to the flip-flop to change its state which, in turn, through gating circuitry, lifts the reset level, and the unit is now active (i.e., enabled for dialing). This reset voltage level is carried to various portions of the circuit via path 180 such as to the output address counter 116. Similarly the reset pulse over path 180 is applied to the touch-pad lock-out flip-flop 174 to reset it to its gated position ready for the next signal from the touch-pad lock-out gate 172. Thus the reset line 180 conditions each of the flip-flops and gates into its proper state for receiving the next impulses that will render them operative during the off-hook position.

During the time of disconnect most of the circuit components arranged for reset are reset except for the scratch-pad memory 66 and the address counter 84. According to the invention the memory 66 retains the data information that was dialed originally into it on the previous call. In addition, the input address counter 84 is not reset but is arranged to retain the total number of actuations of buttons 50 made on the touch-pad 20 for the previous call. The output address counter 116 however is reset during off-hook as previously described to its zero position so that if the output address lines 120 in sequence were triggered, it would automatically be addressed to the first number that was entered into the memory 66. This number would be the first number that is dialed.

Once the lines 14 have been reconnected to the exchange 10 upon operation of the start button 176, the output sequence from the memory 66 may be started again by merely depressing the memory dial button 24. As previously described the depression of the button 176 will trigger the output sequence flip-flop 110 via the memory dial gate 171.

When the memory dial (MD) button 24 is depressed, the memory dial gate 171 is energized over path 173 simultaneously with the touch-pad lock-out gate 172. The two-input memory dial gate 171 is thus operated either by the operation of the memory dial button 24 or the write pulse received over the path 179 from the write gate 80. Either the first write pulse during the dialing of a new number or the depression of the memory dial button 24 will trigger the output sequence FF 110. The start output sequence gate 124 will now have the necessary enabling conditions at its input so that the next T3 pulse over path 126 will trigger the output circuitry by means of the pulse produced by the gate 124 and thence to the output address flip-flop 127 as previously described. Each digit thus that is stored in the scratch-pad memory 66 will now be read out of the memory. When the last digit has been read out, the comparator 114 will disable the start output sequence gate 124 so that after the last digit is processed the T3 pulse will not trigger any of the output circuitry.

Computer Telex Exchange Operation

The circuit just described illustrates the invention embodied for use in an Automatic Telex Exchange (ATE). According to the invention means are provided for applying the memory dial unit 22 to a Computer Telex Exchange (CTE), of the type more recently used to replace, in many respects, the ATE types of teletypewriter switching systems. This may be done with the physical removal of a printed circuit card containing logic for the ATE mode and replaced by a printed circuit card containing logic for the CTE mode.

For this form of the invention used in a CTE system, the first number that is depressed in the touch-pad unit 20 is encoded to the conventional baudot code used in CTE. The baudot code requires five bits of encoded information whereas the binary system as used for ATE form of the invention required only four bits of information. According to the invention means are provided for combining into a single integral unit a memory dial unit that is arranged to handle both ATE as well as CTE systems. In order to accomplish this a printed circuit card arranged for CTE operation is received in suitable receptacle the unit and the ATE printed circuit card is removed. The physical form of such an arrangement is shown in the drawing only by the terminals on the right side of FIGS. 3b and 3c corresponding to the circuit common to both forms of systems and the terminals on the left side of FIGS. 5 and 6 corresponding, respectively, to the ATE and CTE form of operation.

The terminals are numbered 182 through 199 some of which are not used for both forms as will be readily apparent from a study of the connections needed for each type system.

In view of the need of a baudot code to process the digit information from the touch-pad to the switching terminal, an integral 64-bit scratch-pad memory 66 would have to be replaced with an 80-bit memory based on the need of five bits of 16 words each. It will be apparent to those skilled in the art, that such as expansion of the memory and associated logic is within the state of the art. Such a unit for storing 80-bits of data however is not presently commercially available. Rather than develop such a module, according to one embodiment of the invention, a 16-bit memory is arranged to supplement the 64-bit memory 66. Thus means are provided for storing the fifth bit of data that is required for the baudot code in addition to the four bits that are now stored in the memory 66.

Figure 6:
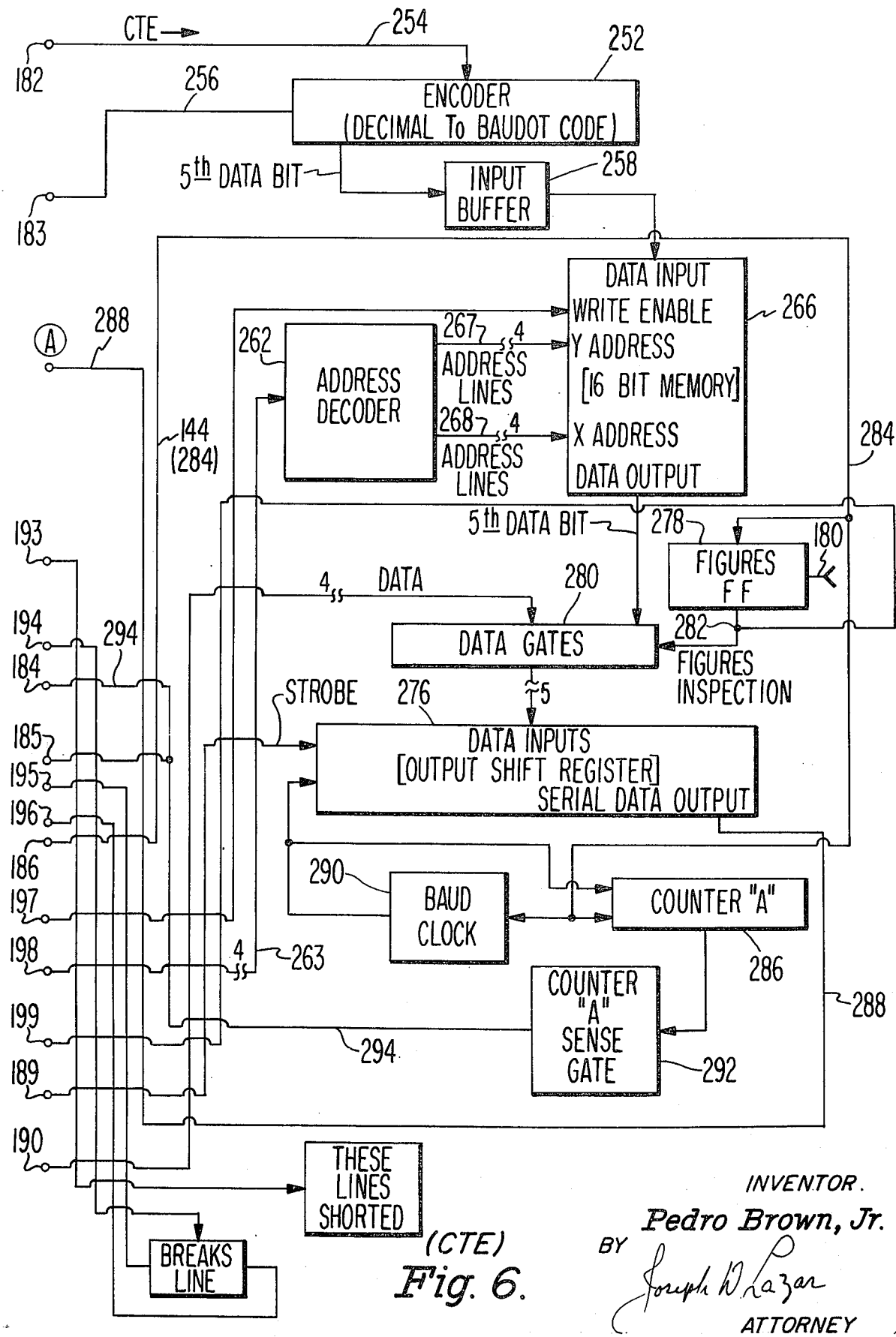
FIG. 6 indicates in block diagram form the details of a computer teletypewriter exchange system.

Referring now to FIG. 6, encoder 252 corresponds to the decimal-to-binary code encoder 52 of FIG. 5. Encoder 252 is arranged to convert the decimal form of ground impulses from the touch-pad 20 to the baudot code. The decimal signals from buttons 50 are applied to the encoder 252 over conductor paths 254 and the encoder generates signals to the scratch-pad memory 66 via the four conductors 256 to the four flip-flops of the input buffer 58. The fifth bit of data from the encoder 252 is applied to a single stage flip-flop buffer 258, the output of which is applied to a 16-bit memory 266. In order to change the binary data into coded address lines an address decoder 262 is provided to feed its output over conductors 267 and 268 as the Y and X address inputs to the 16-bit memory 266. Each X, Y combination will select 1 bit out of the 16 bits available. The decoder 262 receives its input from the input address gates 102 and the output address gate 122 both over the four conductors 263. For the purpose of addressing the 16-bit memory 266, the CTE module (FIG. 6) requires in accordance with the usual form of the baudot code, a "FIGURES" character to be sent on the line 14 to the exchange as the first character of the code. In the memory dial module 22 this is accomplished by a FIGURES data inserted into an output shift register 276. This insertion is accomplished by a Figure's flip-flop 278 applying its output voltage to five data gates 280 over conductor 282. The flip-flop 278 is gated by the clock control flip-flop 142 over conductor 144. The FIGURES insertion is never stored in the memory. According to the operation of the circuit the FIGURE insertion is preset into the shift register 276 during the first set of output pulses T3, T4 and T5. The Figure's flip-flop 278 performs two functions. First, it temporarily stores the character for FIGURE in the data gates 280 until it has been properly processed. Thereafter it will let other data flow from the memory comprising the 64-bit memory 66 and the 16-bit memory 266 to the output registers 276. Secondly, flip-flop 278 will function to keep the output address counter 116 from incrementing on the first set of output pulses, T3, T4 and T5, since it is necessary that the information be retrieved at the zero address in the memories 66 and 266, for the first character stored into the memory.

In a manner similar to that of the ATE embodiment, described with respect to FIG. 5, data is stored in the memory 266 in addition to the memory 66 through the data gates 280. Data gates 280 is formed of five separate gates connected to each of the five bits which are read out of the memories 66 and 266 respectively. The output shift register 276 passes the coded information in serial data form over conductor 288 to the NSI output 153 when the output cycle pulse T5 is generated. A baud clock 290 (FIG. 6), similar to the binary dial pulse clock 148 (FIG. 5), is under control of the clock control FF 142 over conductor 284 (144). The baud clock 290 generates pulses, suitably at a 50 baud clock rate, that are applied to both the output shift register 276 and the counter A 286. The output of the counter 286 is applied, through a counter A sense gate 292, to the digit cycle flip-flop 130 over conductor 294.

The Computer Telex Exchange (CTE) systems require that each character using the baudot code be generated on a line so as to be at least 7.5 units long. Eight unit characters are generated by the memory dial module 22 as a preferred form. Each unit of the code consists of the "start", five data bits corresponding to the baudot code, and two "stop" bits. The output counter 286 is arranged to count eight clock pulses from the baud clock 290 under the control of flip-flop 142 over conductor 284. This count will indicate that the required character has been serially shifted out of the output shift register 276. At the count of eight, the counter sense gate 292 will trigger the clock control flip-flop 142 and the digit cycle flip-flop 130 over conductor 294. Upon the triggering of these two flip-flops, the clock pulses will be terminated and digit cycle FF 130 reset and thus enable the output sequence to retrieve another digit from the memories 266 and 66.

Figure 4:
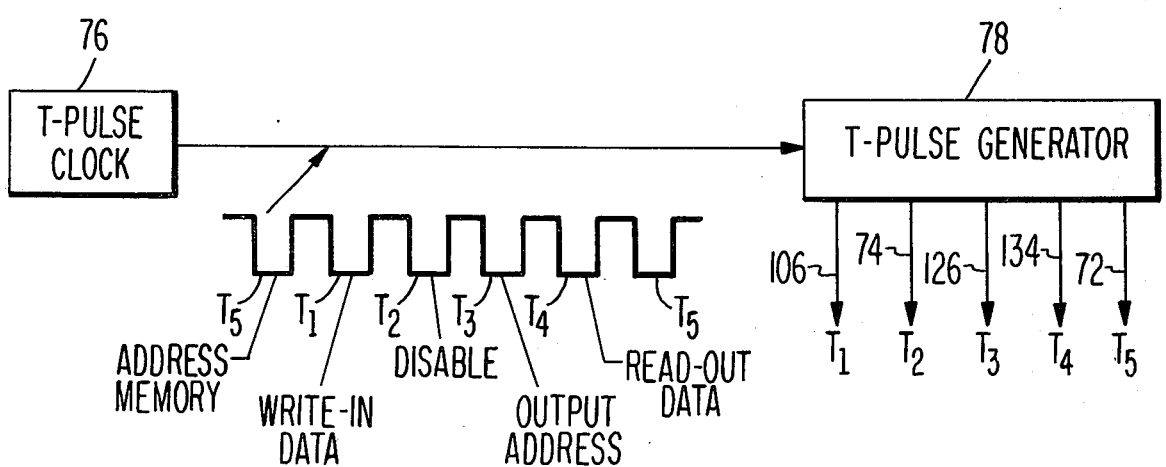
FIG. 4 is a block diagram of the timing pulse generator.

FIG. 7 shows a series of wave forms in time sequence relation correlating the T-pulses T1 through T5 that serve as the control pulses generated by the T-pulse generator 78 (FIG. 4). The pulses produced by the T-pulse generator are shown in the upper portion of FIG. 7 showing the relative position of each pulse in sequence as it is passed from the generator over the several conductor paths as has been previously explained.

The various gates, flip-flops and other logic components of the system are below the T-pulses with the 0 and 1 state of each shown in the time sequence relative to the T-pulses. The overall sequence of operation will now be apparent in view of the previous description of the embodiment for ATE operation. The operation for the CTE system (FIG. 6) is substantially the same noting that several of the components of the CTE system are to be substituted in the chart for the ATE system. Thus the dial pulse clock 150 is equivalent in FIG. 6 to the baud clock 290.

It will be apparent to those skilled in this art that is more than one subscriber's number is to be stored and later erased from a memory dial unit 66 according to this invention, suitable switching and control units may be incorporated to hold a plurality of different subscriber's numbers in a corresponding additional number of similar scratch-pad memories 66. By such an arrangement any dialed number which cannot be completed on the first try can be kept in a first storage unit 66 for repeated tries thereafter by simply operating the MD button 176 corresponding to a first such stored number. Additional new numbers can be stored in additional memory units 66 and appropriate MD buttons must be provided to automatically redial such a selected number.

What is claimed is:

1. In a switching system for a plurality of teletypewriter stations, a switching exchange, and a plurality of communication paths extending from said exchange to said stations, the combination comprising:
   a. control means responsive to calling information establishing connections from one of said stations through said switching exchange to selected ones of said paths to another station corresponding to the calling information;
   b. a plurality of manually operable key means for generating calling information;
   c. said manually operable key means being located at each of said stations;
   d. electrical circuit means for encoding the calling information produced by said manually operable key means to a desired code form;
   e. electrical circuit memory means for storing the coded form of the calling information;
   f. electrical circuit means responsive to the operation of said key means for processing the data stored in said memory to said exchange and electrical circuit means for retaining said data in said memory until new calling information is generated by said manually operable key means; and
   g. manually operable electrical circuit means including a repertory key for processing said stored data from said memory to one of said paths automatically with the operation only of said repertory key.

2. In a switching system according to claim 1 adapted to respond to dial pulses for switching functions, further including electrical circuit means for encoding the calling information over said paths from said stations in dial-pulse form.

3. In a switching system according to claim 1 adapted to respond to the baud teletypewriter code for switching functions, further including electrical circuit means for encoding the calling information from said manually operable means into the baud code for transmitting the calling information over said paths from said stations in baud teletypewriter code.

4. In a switching system according to claim 1 including electrical circuit means for holding the coded information in said storage means until said manually operable key means generates new calling information and menas for resetting said control electrical circuit means, and said processing means to a circuit logic stat for receiving new calling information generated by said manually operable keys.

* * * * *

UNITED STATES PATENT OFFICE
CERTIFICATE OF CORRECTION

PATENT NO. : 3,961,130

DATED : June 1, 1976

INVENTOR(S) : Pedro Brown, Jr.

It is certified that error appears in the above-identified patent and that said Letters Patent are hereby corrected as shown below:

Col. 1, line 21, change "be" to --by--

Col. 4, line 4, change "funcitons" to --functions--

Col. 4, line 5, change "testbook" to --textbook--

Col. 4, line 12, change "simplily" to --simplify--

Col. 4, line 32, change "suitable" to --suitably--

Col. 5, line 26, change "repsond" to --respond--

Col. 5, line 33, change "thatt" to --that--

Col. 7, line 66, change "hte" to --the--

Col. 7, line 68, change "addreses" to --addresses--

Col. 8, line 21, change "unitl" to --until--

Col. 9, line 10, change "28" to --128--

Col. 9, line 11, change "182" to --82--

Col. 9, line 52, change "milliseconds" to --microseconds--

Col. 9, line 53, change "milli-" to --micro- --

Col. 10, line 39, change "normaly" to --normally--

Col. 13, line 23, change "as" to --an--

Col. 14, line 64, change "is" to --if--

UNITED STATES PATENT OFFICE
CERTIFICATE OF CORRECTION

Patent No. 3,961,130         Dated June 1, 1976

Inventor(s) Pedro Brown Jr.

It is certified that error appears in the above-identified patent and that said Letters Patent are hereby corrected as shown below:

Column 16, line 27, change "menas" to -- means --.

Column 16, line 28, after "means," insert -- said encoding means, --.

Column 16, line 28, change "stat" to -- state --.

Signed and Sealed this

Nineteenth Day of October 1976

[SEAL]

Attest:

RUTH C. MASON
Attesting Officer

C. MARSHALL DANN
Commissioner of Patents and Trademarks